Oct. 6, 1959     B. W. NIES ET AL     2,907,668
CALCINATION OF GYPSUM
Filed March 30, 1956
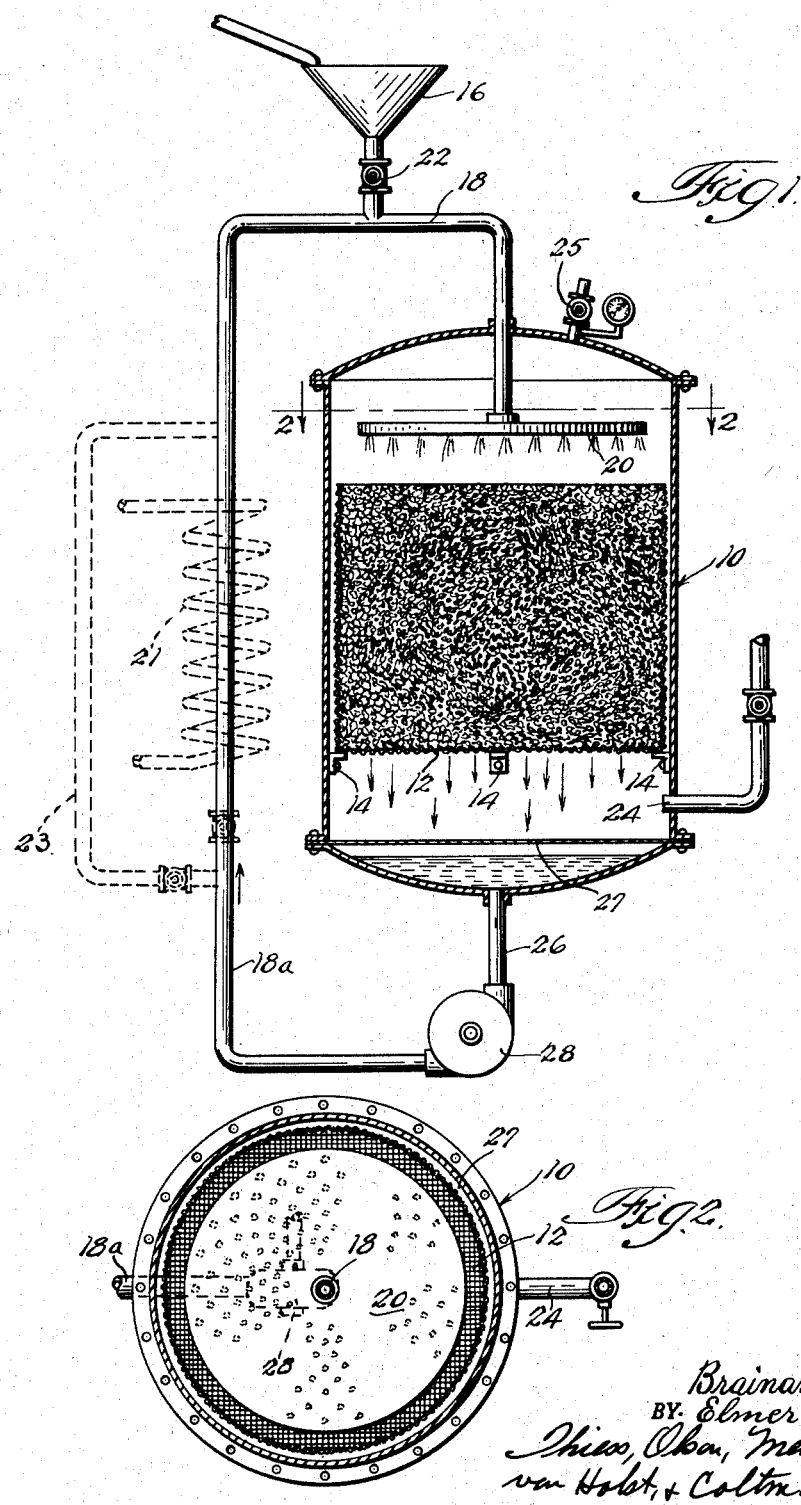
INVENTORS
Brainard W. Nies &
BY Elmer S. Johnson 2,907,668
CALCINATION OF GYPSUM Brainard W. Nies, Crystal Lake, and Elmer S. Johnson, Arlington Heights, Ill., assignors to United States Gypsum Company, Chicago, Ill., a corporation of Illinois Application March 30, 1956, Serial No. 575,257

9 Claims. (Cl. 106—111)

This invention relates to a process for calcining gypsum, and, more particularly, pertains to an improved liquid calcination method for preparing alpha gypsum utilizing a novel percolation step.

There are basically two forms of calcined gypsum plaster now being prepared commercially. The outstanding differences between these two plasters are (1) their normal consistency, i.e., the amount of water in cubic centimeters required to gauge 100 grams of the plaster so that it will just pour from a cup; and (2) the physical nature of the respective individual plaster particles. One of these forms of plaster is referred to as regular calcined gypsum and is prepared by heating the dihydrate at atmospheric pressure in either a kettle or a rotary calciner. The resulting product has a consistency of between about 60 to 80 cc. per 100 grams of material. An examination of this material under the microscope will show that it consists of very small crystals which are somewhat loosely agglomerated together into larger size particles. These extremely small crystals are presumably caused by the rupture of fragments of gypsum crystals when the water escapes as steam during the calcining step. The second form of plaster now being used commercially is known as alpha gypsum. This material is characterized by a much lower consistency than the above, requiring only between 28 to 45 cc. of water per 100 grams to give a pourable slurry. This material is further characterized by each particle of the finely ground plaster in general being mono-crystalline, that is, formed from a single or fragment of a crystal and not in general from a loose cluster of very small crystals as in the case of regular calcined gypsum. This second product is prepared by heating the dihydrate under controlled vapor pressure conditions in the presence of steam or in an aqueous solution.

The dissimilarity in the physical nature of the plaster particles of these two forms of calcined gypsum gives rise to a marked difference in their surface properties and accounts primarily for the difference in their consistencies. The alpha gypsum particles being more unicrystalline provide a relatively smooth surface free of clusters of minute crystal particles which later tend to take up water and hence increase the consistency. The clusters of smaller size crystals tend to have a greater surface area per unit weight than the larger single crystals. This is reflected in an increase in the consistency as it has been found that the lower the surface area per unit weight the lower the consistency. The surface area in square centimeters per gram, commonly referred to as the Blaine coefficient, see ASTM C204–51, is a means of evaluating the surface characteristics of the particle. Besides having each particle unicrystalline so as to reduce the surface area per unit weight, it is also important to have the particle as close to a cube or a sphere as possible, which are the geometric forms having a minimum of surface to volume ratio. It has been well established that in general, the lower the consistency the greater the strength of the resultant cast. For example, a plaster cast formed from alpha gypsum plaster poured at a consistency of about 30 cc. will have a compressive strength as high as 10,000 pounds per square inch, while one poured at a consistency of about 45 cc. may have a strength under 5,000 pounds per square inch. Hence, it is important to have the consistency as low as possible in order to obtain the strongest cast.

The first form of calcined gypsum mentioned above dates back to antiquity while the second form, or alpha gypsum, has not been known until quite recently when the first method of preparing it was set forth in Patent No. 1,901,051, issued to Randel and Dailey. As disclosed in this patent, lump gypsum is calcined in an atmosphere of steam under certain controlled conditions to form crystals of calcined gypsum which are somewhat elongated, and when the product is properly ground, it results in a plaster having a consistency of 40 to 45 cc. This was so much lower than the 60 to 80 cc. consistency obtained with regular plaster, that its greater strength, arising out of the lower consistency, was a sensational advance in the art. Compressive strengths higher than 5,000 pounds were secured.

Later a patent issued to Haddon, No. 2,448,218, which discloses a process of making alpha gypsum in which the individual crystals are squattier or more cubic than those made in accordance with the process disclosed in the Randel and Dailey patent, and, as a result, plaster made therefrom requires even a lesser amount of water for gauging with consequent further increase in the strength of casts made therefrom. However, in accordance with the Haddon method, the gypsum must be first ground into a powdered form, must be agitated in a solution containing a crystal-habit-modifier under pressure and at a temperature between 125° C. to 160° C. for at least two hours. The inefficiency of this process is apparent from the large expense which is encountered in consumption of the large volumes of crystal-hibit-modifier solutions, the expense of heating the large volume liquid solutions which result, and the expense of agitation; the cost of the equipment for carrying out this process is obviously also expensive.

Accordingly, it is an object of this invention to provide an improved liquid calcination method for producing alpha gypsum of low consistency in a simple and novel manner.

It is a further object of this invention to disclose a method of calcining gypsum utilizing crystal-habit-modifier solutions in which the amount of such solutions utilized is maintained at a minimum.

It is a further object of this invention to provide a liquid calcination process for producing alpha gypsum of low consistency which requires a minimum thermal input while producing alpha gypsum of the highest quality.

The above and other objects will become more apparent from the following description, accompanying drawing and appended claims.

The contribution of this invention which is a further development in the production of a high quality alpha gypsum having a low consistency comprises the discovery that gypsum rock need not be immersed in a crystal-habit-modifier solution during calcination if low consistency alpha gypsum is desired. It has been found that the maintaining of the gypsum particles in a wet condition, such as may be effected by percolation of the crystal-habit-modifier solution over the gypsum particles, is sufficient.

In one embodiment of this invention a crystal-habit-modifier which may comprise one of certain dicarboxylic acids or their salts, such as potassium succinate, is percolated through a bed of gypsum particles in an autoclave. The percolation is carried out in a manner so as to distribute the solution of potassium succinate or other crystal-habit-modifier evenly over the gypsum particles so as to maintain the surface of each particle wetted thereby, at least during the initial portion of the calcination, as will hereinafter be explained in greater detail.

For purposes of this invention, the gypsum particles being processed should be preferably no larger than 1½ inches in size nor should they be smaller than 16 mesh. The percolation is effected in the presence of saturated steam until the change from gypsum dihydrate to hemihydrate is complete. In the course of the alpha gypsum formation, the concentration of the crystal-habit-modifier solution will become increasingly weaker because of the condensed steam dilution and the addition of the gypsum water of hydration which is driven out of the gypsum particles.

The initial concentration of the crystal-habit-modifier in the percolating solution should be sufficient so that, at the end of the calcining operation in which utilized, the concentration thereof is at least .05 percent by weight. The dilution of the crystal-habit-modifier may be maintained at a minimum by heating the autoclave by means other than steam. For instance, the autoclave may have a steam jacket, or an electric coil may be inserted in the autoclave. It should be remembered, however, that the percolation is to be carried out in a saturated steam atmosphere to allow growth of the desired crystals.

The benefits which the provided process effects over the disclosure contained in the Haddon application are obvious. A gypsum product of equal or lower consistency is formed while the cost of running the process may be as low as 50 percent of the cost of running the Haddon process as will hereinafter be made apparent.

For a better understanding of this invention, therefore, reference should now be given to the drawing, wherein Figure 1 is a sectional view of apparatus which may be utilized in practicing the subject invention; and Fig. 2 is a sectional view taken on line 2—2 of Fig. 1.

An inspection of the provided drawing will facilitate an understanding of the manner in which the subject calcination process may be performed. The numeral 10 in the drawing refers to an autoclave in which a readily removable wire basket 12 is disposed. The basket 12 may be supported by bracket members 14 or other equivalent means secured to the inner periphery of the autoclave. The basket 12 contains gypsum particles within the prescribed particle size range of between 1½ inches and 16 mesh. These particles are evenly distributed to a uniform depth in the wire basket.

In the normal course of operation, an aqueous solution of a crystal-habit-modifier such as potassium succinate is deposited in a funnel member 16 in communication with a pipe line 18 which, in turn, communicates with a perforated distributing pan member 20 which is shown suspended in the interior of the autoclave 10 by means of the pipe line 18 in Fig. 1. The admission of the potassium succinate solution to the pipe line 18 may be regulated by a valve member 22 interposed between the funnel member 16 in the pipe line 18.

Immediately after the admission of the crystal-habit-modifier, steam is admitted to the interior of the autoclave 10 by means of an inlet 24 while the air in the autoclave is simultaneously removed by means of a vent 25. In the normal course of operation, the crystal-habit-modifier solution flows through the apertures in the pan member 20 so as to be evenly spread over the underlying gypsum particles contained in the wire basket 12. The perforations in the pan 20 are spaced so as to insure wetting of all the underlying gypsum particles. As the potassium succinate percolates through the gypsum particles in the saturated steam atmosphere, the gypsum particles are calcined, and the crystalline structure of the gypsum particles changes from the dihydrate to the hemihydrate. The hemihydrate crystalline structure is squattier and insures low consistency of the ultimate gypsum product.

As the steam enters the interior of the autoclave, a portion of it condenses, and along with the down-flowing potassium succinate, leaves the interior of the autoclave through the pipe line segment 26 after first passing through a filter 27, whereupon the combined liquids enter the pump 28 and are forced thereby through the pipe line portions 18a and 18 to once again enter the autoclave 10 and pass through the apertured pan 20.

As has been previously mentioned, the autoclave 10 and the recycled solution may be heated by means other than the steam entering through inlet 24. For instance, coil 21 illustrated in dotted lines in Fig. 1 may be employed to heat the recycling solution in the course of its return to the autoclave. The valved by-pass pipe line portion 23 also illustrated in dotted lines may be utilized when added heat from coil 21 is not desired. When other heating means are employed, some of the water in the crystal-habit-modifier solution will be vaporized into steam and dilution of the continually recycled liquid will be maintained at a minimum. The only dilution would result from the vaporization of the water of hydration from the initially inserted gypsum particles. It is obvious that the autoclave and all conduits handling the recycling solution should be well insulated for purposes of thermal efficiency.

The steam pressure during the calcination is maintained in the range of from 15 to 40 pounds per square inch gauge. The recirculation of the crystal-habit-modifier solution may be discontinued after a period of anywhere from three to seven hours, and the remainder of the calcination may be effected in a steam atmosphere. The period of time that it takes for the desired crystal structure to be formed must be determined by experiment. It is recommended, therefore, that, after three hours operation, a portion of the gypsum particles be withdrawn from the autoclave and the crystal structure examined to determine the degree of conversion. If there has been a sufficient conversion, the recycling of the crystal-habit-modifier solution which is continuously percolated through the gypsum particles is stopped and the calcination is continued under steam pressure for from one to three hours.

The following examples are illustrative of the manner in which the inventive concepts herein disclosed may be carried out.

EXAMPLE 1

One hundred eighty pounds of gypsum rock having a particle size between ½ inch and 8 mesh were placed in a wire basket and lowered into an autoclave; 2.52 gallons of 0.94 percent solution of succinic acid neutralized with potassium hydroxide was poured over the rock. This is a ratio of 8.57 pounds of rock per pound of solution. A perforated pan was placed over the rock; steam was introduced directly into the autoclave through an inlet positioned in the bottom, and an air vent adjusted to bring the pressure in the autoclave to 20 pounds per square inch gauge. This pressure was maintained for seven hours by regulating the amount of steam introduced. During the entire calcination, the solution was circulated by removing it from the bottom of the autoclave and reintroducing it over the top of the rock contained in the autoclave by discharging upon the perforated pan which distributes it evenly over the rock surface before dripping downwardly therethrough. The pumping rate was 6.6 gallons per minute. At the end of the calcination, the volume of solution increased from 2.5 gallons to 13.9 gallons. This increase was due to approximately 8.9 gallons from the condensed steam and 2.5 gallons from the calcined rock. The concentration of neutralized succinic acid thus was decreased from 0.94 percent to 0.17 percent.

The calcined rock was dried in a drum drier and ground to a fineness of 95 percent through a No. 100 mesh sieve. This plaster had a consistency of 29 cc. at the top of the autoclave and 29.5 cc. at the bottom, or an average of 29.3 cc., which is as low or better than is obtained following the process disclosed in the above-identified Haddon patent.

Care should be exercised during drying to maintain the temperature above 212° F. so as to prevent the particles from rehydrating. A dryer temperature of between 240° F. to 245° F. has been found to be quite satisfactory. Caution should be followed in drying so as not to further calcine the product to the anhydrite state. Grinding can be carried out in a buhr, hammer or Raymond mill and, if a greater degree of fineness is desired, then in a tube mill. The particle size relation obtained by grinding is an important factor in securing the desired consistency, hence close attention should be given to this operation so as to obtain as low a Blaine coefficient as possible consistent with the plasticity required. A coarse grind gives a low Blaine coefficient and low consistency but also a low plasticity which may not be suitable for some purposes. Hence a balance between consistency, Blaine coefficient and the plasticity should be reached. A consistency as low as 30 cc. or lower can be obtained with fairly good plasticity if close attention is given to calcining and grinding details.

A number of other runs were made under the same steam pressures and rates as the above example, but at different concentrations of succinic acid, and at different rock to solution ratios. These runs are summarized in subjoined Table 1:

*Table 1*

| Pounds of Rock per Pound of Solution | Percent Potassium Succinate in Solution | | Percent Reduction Water as Normally Used | Product Data | | | |
|---|---|---|---|---|---|---|---|
| | Before | After | | Consistency in cc. | | Percent of Combined H₂O | |
| | | | | Top | Bottom | Top | Bottom |
| 12.9 | 2.10 | 0.27 | 92.0 | 29.5 | 29 | 7.27 | 7.68 |
| 6.5 | 1.56 | 0.34 | 84.5 | 29.5 | 29.5 | 7.26 | 7.48 |
| 6.4 | 1.06 | 0.24 | 84.4 | 29 | 28.5 | 6.52 | 6.59 |
| 3.1 | 0.76 | 0.28 | 67.8 | 29.5 | 30 | 6.84 | 6.99 |
| 8.6 | 0.66 | 0.12 | 88.5 | 29.5 | 29.5 | 6.23 | 6.19 |
| 3.3 | 0.49 | 0.18 | 69.7 | 30.5 | 30.5 | 6.56 | 6.47 |
| 8.6 | 0.47 | 0.09 | 88.5 | 30.5 | 30.5 | 6.19 | 6.20 |
| 3.3 | 0.24 | 0.09 | 69.7 | 32 | 33 | 6.27 | 6.23 |
| 12.9 | 2.10 | ¹0.27 | | 29 | 28.5 | 6.23 | 6.43 |
| 12.9 | 0.98 | ¹0.13 | | 30 | 30.0 | 6.29 | 6.15 |

¹ Solution circulated at 1.1 gallons per minute; all others at 6.6 gallons per minute.

It has been found that the pressure utilized in the calcination operation can be progressively increased whereby the total calcination time is shortened but the quality of the final product remains unaltered. The following example illustrates a process whereby the calcining time may be shortened while still maintaining the final alpha gypsum product at low consistency.

EXAMPLE 2

One hundred eighty pounds of gypsum rock sized between ½ inch and 8 mesh were placed in the same autoclave as used in Example 1 with 3.2 gallons of a 1.61 percent solution of succinic acid neutralized with potassium hydroxide. The autoclave was heated in the same manner with the exception that after three hours at 20 pounds per square inch gauge, the pressure was increased to 30 pounds per square inch gauge. After 1.5 hours at 30 pounds per square inch gauge, the pressure was again increased to 40 pounds per square inch gauge for one hour or a total of 5.5 hours before the autoclave was dumped. This is 1.5 hours shorter than the process time of Example 1. After drying and grinding under the same conditions as in Example 1, the consistency was found to be 29.5 cc. and the combined water 6.2 percent. A comparison with the above runs will show that the same type plaster was obtained in 1.5 hours shorter time by using an increase in pressure. This is a decided advantage in production.

Various other runs were made following the same general conditions as in Example 2 with the exception that the times at the various pressures were varied as well as the solution concentrations. The results obtained are summarized in subjoined Table 2:

*Table 2*

| Hours of Calcination Following Gauge Pressures | | | | Pounds of Rock per Pound of Solution | Percent Potassium Succinate in Solution ¹ | Product Data | |
|---|---|---|---|---|---|---|---|
| 20 | 30 | 40 | Total | | | Consistency | Combined H₂O |
| 2 | 1.5 | 1.5 | 5 | 6.67 | 1.08 | 31.5 | 6.24 |
| 2 | 1.5 | 1.5 | 5 | 6.67 | 1.61 | 30.5 | 6.15 |
| 2.5 | 1.5 | 1 | 5 | 6.67 | 1.61 | 30 | 6.45 |
| 3.5 | | 1¼ | 4⅝ | 6.67 | 1.61 | 30.5 | 6.22 |
| 2.5 | 1.5 | | 4 | 6.67 | 1.61 | 31 | 6.42 |
| 3.5 | | 1.5 | 5 | 6.67 | 2.20 | 31 | 6.20 |
| 3 | 2 | | 5 | 6.67 | 2.20 | 29.5 | 6.37 |
| 3 | 2 | .5 | 5.5 | 6.67 | 1.61 | 29.5 | 6.23 |

¹ At start of calcination. These concentrations were reduced approximately 85 percent during calcination.

It should be remembered in performing the process disclosed in Example 2 that any increase in pressure should not be made too soon after the calcination has been initiated and the pressure increase should not be too high. The time and pressure increases disclosed in the examples of Table 2 are indicative of the magnitude of each which are suitable for purposes of this invention.

It has been shown by comparison that there is substantially no difference in the consistency and the combined water between plaster made following a process in which the gypsum particles are completely immersed in a crystal-habit-modifier solution and a process utilizing the percolation method herein disclosed.

However, there is a great deal of difference in the thermal efficiency, as the percolation method will use much less heat as there is markedly less solution per pound of rock to heat up. It was found possible to calcine 12.9 pounds or more of rock per pound of solution following the percolation method; while with the immersion method, only one pound of rock could be calcined with a pound of solution.

The theoretical heat requirement for this process, exclusive of the solution is 204,400 B.t.u./ton. With a pound of rock per pound of solution an additional 378,000 B.t.u./ton of rock is required or a total of 582,400 B.t.u./ton. The heat required for the solution alone is 85 percent greater than that required for conversion. If 13 pounds of rock can be processed with one pound of solution, the additional heat for the solution is only 29,100 B.t.u./ton of rock, or a total of 233,500 B.t.u./ton.

The savings in heat is thus 582,400 less 233,500 or 348,900 B.t.u./ton of rock. This is 60 percent of the total heat required for the immersion method. Assuming about 10,000 B.t.u./pound of coal, this amounts to about 35 pounds of coal saved for every ton of rock.

As the volume of solution is decreased, i.e., the lowering of the amount of solution per pound of rock, the dilution due to loss of combined moisture and/or condensate from direct steam becomes more critical. It is, therefore, necessary to increase the initial concentration of the calcining liquor to compensate for this dilution to obtain the desired consistency. If the initial concentration is increased too much, the rate of calcination will be decreased to an uneconomic degree. In general, it can be stated that the final concentration after dilution should not be substantially lower than the minimum value of that range which would normally be used in a static solution calcination for a particular operating condition.

It is believed that by a continuous flow of solution there is a more efficient heat transfer and a more uniform composition than by the use of a static solution. The basic requirement for successful application of this technique is that the rock be continuously wetted during the critical initial calcination period. After this time, the crystal-habit-modifier solution may be drained off and the process finished by steam calcination, in the manner previously disclosed.

In addition to the savings in fuel there is also the savings in the succinate or other chemicals used, as there is less used per pound of rock and also less to be discarded because of dilution. A savings of as much as 50 percent can be expected over prior art methods such as disclosed in the Haddon patent.

Throughout the description of this invention, potassium succinate is given as the preferred example of crystal-habit-modifier material; however, any of the soluble aliphatic acids, or their soluble alkali salts having in their molecules at least two carboxyl groups separated by two carbon atoms with a single bond between intervening carbon atoms such as referred to in the above-identified Patent No. 2,448,218 to Haddon, can also be used. Such substances include succinic acid, citric acid, malic acid, and their salts or mixtures thereof. Succinic acid or its salt is preferred. Maleic acid is also suitable as a crystal-habit-modifier. It is within the scope of this invention to prepare the salt in situ by adding the acid and alkali separately. The process set forth is not to be limited to the crystal-habit-modifiers referred to above, but to all material which will influence the formation of calcium sulfate hemihydrate crystals so that the shorter, wider and squattier type is formed. Throughout the description of this invention, the term "crystal-habit-modifier" is to be construed as meaning such material.

It is also within the scope of this invention to add various wetting agents to the recycled crystal-habit-modifier solution which is continuously percolated through the gypsum particles, at least in the initial portion of the calcination operation. The use of such wetting agents is disclosed in the copending Johnson application Serial No. 574,979, filed March 30, 1956.

While the above examples illustrate preferred embodiments of this invention, it should be understood that other variations can be made in the disclosed process which will remain within the scope of the inventive concepts disclosed. For example, it is possible to use rock sizes varying from about 2 inches to 16 mesh.

The time required for the calcination is a function of the pressure, the concentration of the modifier, the kind of crystal-habit-modifier, and the size of rock. A reduction in the concentration of potassium succinate or other modifier reduces the calcination time but raises the consistency. Care should be used in selecting the calcination conditions which will render the process commercially feasible.

The pressure of the saturated steam used to calcine the treated rock may vary from about 14 to about 40 pounds per square inch gauge and need not be held at one particular pressure throughout the calcination cycle, as it can be adjusted to suit optimum operating conditions in which case the time must be varied accordingly. In general, it is preferred to use a higher pressure than that required by the process set forth in the Randel and Dailey Patent No. 1,901,051. Only 16 to 17 pounds per square inch gauge is sufficient for the latter, while about 20 pounds per square inch gauge is preferred under comparable conditions for the process forming the subject of the present invention. The time-temperature relation can be readily determined by trial from information contained in the above tables. Caution should be exercised at the higher concentrations of the impregnating solution, especially with the finer size lumps so as not to calcine too long and form anhydrite which will increase the consistency and also decrease the usefulness of the plaster.

In order to aid those skilled in the art to practice this invention, the above data has been supplied for a wide range of conditions. Other variations, not given, can readily be evaluated and followed by interpolation from the information supplied or by trial.

It is thus apparent that a method for forming alpha gypsum of low consistency has been provided which effects such savings in the cost of operation so as to render substantially economically unfeasible all other similar methods for forming alpha gypsum known in the prior art.

We claim:

1. The process of producing calcium sulfate hemihydrate comprising heating gypsum particles, wetted with a volume of a crystal-habit-modifier solution insufficient to submerge said particles, in an atmosphere of saturated steam until crystals of calcined gypsum are formed.

2. The process of producing calcium sulfate hemihydrate comprising percolating a crystal-habit-modifier solution through gypsum particles so as to wet the gypsum particle surfaces, said solution being present in quantities insufficient to fill the voids between the particles during normal process operation, while the latter particles are concomitantly being heated in an atmosphere of saturated steam.

3. The process of claim 2 in which said crystal-habit-modifier solution contains a succinyl radical.

4. The process of producing calcium sulfate hemihydrate comprising treating the surface of gypsum particles by percolating an aqueous solution of a crystal-habit-modifier containing an aliphatic acid radical having in its molecule at least two carboxyl groups separated by two carbon atoms with a single bond between intervening carbon atoms, said percolation being effected so as to wet the gypsum particle surfaces, said solution being present in quantities insufficient to fill the voids between the particles during normal process operation, the thus treated gypsum being concomitantly heated in saturated steam until crystals of calcined gypsum are formed.

5. The process of converting gypsum particles of from about 2 inches to about 16 mesh size to a plaster containing fragments of hemihydrate crystals and characterized by a low consistency, comprising percolating an aqueous solution of a soluble crystal-growth-modifier through said gypsum particles so as to wet the gypsum particle surfaces, said solution being present in quantities insufficient to fill the voids between the particles during normal process operation, said modifier containing an aliphatic acid radical having in its molecule at least two carboxyl groups, separated by two carbon atoms, with a single bond between intervening carbon atoms through said gypsum particles, and concomitantly heating them in an atmosphere of saturated steam at a pressure of between about 14 to 40 pounds per square inch gauge until stubby type crystals of calcium sulfate hemihydrate are formed, drying the crystals to remove surplus water without rehydration of the calcium sulfate hemihydrate, and grinding the product.

6. The process of converting gypsum particles to calcium sulfate hemihydrate crystals comprising percolating an aqueous solution of aliphatic acids and their salts having in their molecule two carboxyl groups separated by two carbon atoms with a single bond between intervening carbon atoms through such particles so as to wet the gypsum particle surfaces, said solution being present in quantities insufficient to fill the voids between the particles during normal process operation, while concomitantly heating the treated gypsum in saturated steam until crystals of calcium sulfate hemihydrate are formed.

7. The process of converting gypsum particles to calcium sulfate hemihydrate crystals comprising percolating an aqueous solution of potassium succinate through such particles, so as to wet the gypsum particle surfaces, said solution being present in quantities insufficient to fill the voids between the particles during normal process operation, while concomitantly heating the treated gypsum in an atmosphere of saturated steam under pressure until crystals of calcium sulfate hemihydrate are formed.

8. The process of converting gypsum particles to calcium sulfate hemihydrate crystals comprising percolating an aqueous solution of succinic acid through such gypsum particles so as to wet the gypsum particle surfaces, said solution being present in quantities insufficient to fill the voids between the particles during normal process operation, while concomitantly heating the treated gypsum in an atmosphere of saturated steam under pressure until crysals of calcium sulfate hemihydrate are formed.

9. The process of converting gypsum particles to calcium sulfate hemihydrate crystals comprising percolating an aqueous solution of a crystal-habit-modifier selected from the group consisting of succinic acid, citric acid, maleic acid, malic acid and their soluble salts through such particles so as to wet the gypsum particle surfaces, said solution being present in quantities insufficient to fill the voids between the particles during normal process operation, while concomitantly heating the so treated gypsum particles in an atmosphere of saturated steam under pressure until stubby crystals of calcium sulfate hemihydrate are formed.

References Cited in the file of this patent

UNITED STATES PATENTS

| 2,067,762 | Hoggatt | Jan. 12, 1937 |
| 2,460,267 | Haddon | Feb. 1, 1949 |

FOREIGN PATENTS

| 563,019 | Great Britain | July 26, 1944 |
| 695,323 | Great Britain | Aug. 5, 1953 |
| 134,846 | Australia | Dec. 5, 1946 |
| 504,470 | Canada | July 20, 1954 |

UNITED STATES PATENT OFFICE

CERTIFICATE OF CORRECTION

Patent No. 2,907,668                                            October 6, 1959

Brainard W. Nies et al.

It is hereby certified that error appears in the printed specification of the above numbered patent requiring correction and that the said Letters Patent should read as corrected below.

Column 2, line 38, for "crystal-hibit-modifier" read -- crystal-habit-modifier --; column 6, line 11, Table 2, in the heading to the first column thereof, line 2, before "Following" insert -- at --; column 9, line 12, for "crysals" read -- crystals --.

Signed and sealed this 12th day of April 1960.

(SEAL)
Attest:

KARL H. AXLINE                                          ROBERT C. WATSON
Attesting Officer                                    Commissioner of Patents